(12) United States Patent
Ng et al.

(10) Patent No.: US 10,882,302 B2
(45) Date of Patent: Jan. 5, 2021

(54) POWDER DELIVERY FOR ADDITIVE MANUFACTURING

(71) Applicant: Applied Materials, Inc., Santa Clara, CA (US)

(72) Inventors: Hou T. Ng, Campbell, CA (US); Raanan Zehavi, Sunnyvale, CA (US); Nag B. Patibandla, Pleasanton, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/810,758

(22) Filed: Mar. 5, 2020

(65) Prior Publication Data

US 2020/0207071 A1 Jul. 2, 2020

Related U.S. Application Data

(60) Division of application No. 16/440,731, filed on Jun. 13, 2019, now Pat. No. 10,603,892, which is a
(Continued)

(51) Int. Cl.
*B33Y 30/00* (2015.01)
*B29C 64/153* (2017.01)
(Continued)

(52) U.S. Cl.
CPC .............. *B33Y 30/00* (2014.12); *B05C 19/04* (2013.01); *B22F 3/004* (2013.01); *B22F 3/1055* (2013.01);
(Continued)

(58) Field of Classification Search
CPC ..... B33Y 30/00; B29C 64/321; B29C 64/153; B29C 64/20
See application file for complete search history.

(56) References Cited

U.S. PATENT DOCUMENTS

| 5,304,329 A | 4/1994 | Dickens, Jr. et al. |
| 6,213,168 B1 | 4/2001 | Gaylo et al. |

(Continued)

FOREIGN PATENT DOCUMENTS

| CN | 203635914 | 6/2014 |
| CN | 104010750 | 8/2014 |

(Continued)

OTHER PUBLICATIONS

CN Office Action in Chinese Application No. 201680054098.6, dated Feb. 25, 2020, 5 pages (with English Translation).
(Continued)

*Primary Examiner* — Jacob T Minskey
*Assistant Examiner* — Melody Tsui
(74) *Attorney, Agent, or Firm* — Fish & Richardson P.C.

(57) ABSTRACT

An additive manufacturing apparatus includes a dispensing system positionable over a platen to deliver a powder, an actuator to move the dispensing system along a scan axis, and an energy source to fuse a portion of the powder. The dispensing system has a hopper to hold the powder and a dispenser. The dispenser includes a channel extending along a longitudinal axis from a proximal end to a distal end. The proximal end of the channel of the dispenser is configured to receive the powder from the powder source. A powder conveyor is positioned within the channel to move the powder from the proximal end along a length of the channel, and a plurality of apertures are arranged along the longitudinal axis of the channel. The dispenser is configured such that flow of powder through each aperture is independently controllable.

20 Claims, 9 Drawing Sheets

Related U.S. Application Data continuation of application No. 15/266,420, filed on Sep. 15, 2016, now Pat. No. 10,322,574.

(60) Provisional application No. 62/262,673, filed on Dec. 3, 2015, provisional application No. 62/219,605, filed on Sep. 16, 2015.

(51) Int. Cl.

| | | |
|---|---|---|
| *B29C 64/321* | (2017.01) | |
| *B29C 64/241* | (2017.01) | |
| *B29C 64/205* | (2017.01) | |
| *B05C 19/04* | (2006.01) | |
| *B22F 3/00* | (2006.01) | |
| *B22F 3/105* | (2006.01) | |
| *B29C 31/02* | (2006.01) | |
| *B29C 64/20* | (2017.01) | |

(52) U.S. Cl.
CPC ............ *B29C 31/02* (2013.01); *B29C 64/153* (2017.08); *B29C 64/20* (2017.08); *B29C 64/205* (2017.08); *B29C 64/241* (2017.08); *B29C 64/321* (2017.08); *B22F 2999/00* (2013.01)

(56) References Cited

U.S. PATENT DOCUMENTS

| | | |
|---|---|---|
| 6,641,778 B2 | 11/2003 | McGregor |
| 7,828,022 B2 | 11/2010 | Davidson et al. |
| 8,550,802 B2 | 10/2013 | Fuwa et al. |
| 8,888,480 B2 | 11/2014 | Yogi et al. |
| 2005/0263933 A1 | 12/2005 | Welch et al. |
| 2005/0280185 A1 | 12/2005 | Russell et al. |
| 2007/0257394 A1 | 11/2007 | Borkenhagen et al. |
| 2011/0109016 A1* | 5/2011 | Fuwa .................. B22F 3/004 264/460 |
| 2017/0036404 A1 | 2/2017 | Rengers et al. |
| 2019/0308406 A1 | 10/2019 | Ng et al. |

FOREIGN PATENT DOCUMENTS

| | | |
|---|---|---|
| CN | 204604919 | 9/2015 |
| CN | 104162992 | 10/2016 |
| EP | 2281677 | 2/2011 |
| JP | 1103243514 A | 10/1991 |
| JP | 2005-335391 | 12/2005 |
| JP | 2009-039661 | 2/2009 |
| JP | 2009-279928 | 12/2009 |
| JP | 2015-091570 | 5/2015 |

OTHER PUBLICATIONS

Extended European Search Report in EP Appln. No. 16847283.5, dated Apr. 18, 2019. 10 pages.
International Search Report and Written Opinion in International Application No. PCT/US2016/051894, dated Dec. 13, 2016, 9 pages.
Office Action in Chinese Application No. 201680054098.6, dated Jun. 12. 2019, 10 pages (with English translation).
JP Office Action in Japanese Application No. 2018-513616, dated Aug. 21, 2020, 31 pages.

\* cited by examiner

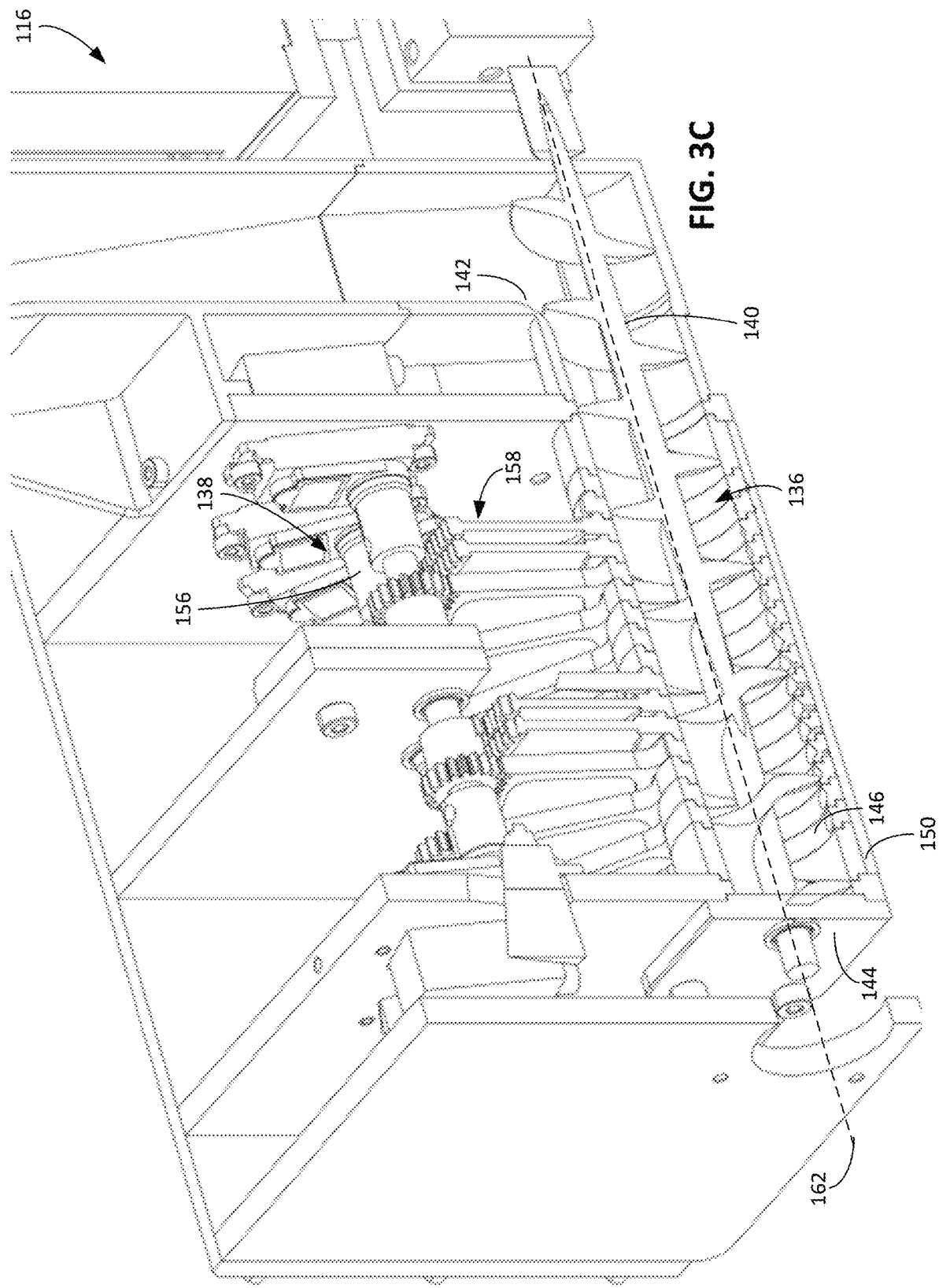

POWDER DELIVERY FOR ADDITIVE MANUFACTURING

CROSS-REFERENCE TO RELATED APPLICATIONS

This application is a divisional of U.S. patent application Ser. No. 16/440,731, filed Jun. 13, 2019, which is a continuation of U.S. patent application Ser. No. 15/266,420, filed Sep. 15, 2016, which claims priority to U.S. Provisional Application Ser. No. 62/262,673, filed on Dec. 3, 2015, and to U.S. Provisional Application Ser. No. 62/219,605, filed Sep. 16, 2015, the entirety of each being incorporated by reference.

TECHNICAL FIELD

This specification relates to additive manufacturing, also known as 3D printing.

BACKGROUND

Additive manufacturing (AM), also known as solid freeform fabrication or 3D printing, refers to a manufacturing process where three-dimensional objects are built up from successive dispensing of raw material (e.g., powders, liquids, suspensions, or molten solids) into two-dimensional layers. In contrast, traditional machining techniques involve subtractive processes in which objects are cut out from a stock material (e.g., a block of wood, plastic or metal).

A variety of additive processes can be used in additive manufacturing. Some methods melt or soften material to produce layers, e.g., selective laser melting (SLM) or direct metal laser sintering (DMLS), selective laser sintering (SLS), fused deposition modeling (FDM), while others cure liquid materials using different technologies, e.g., stereolithography (SLA). These processes can differ in the way layers are formed to create the finished objects and in the materials that are compatible for use in the processes.

Conventional systems use an energy source for sintering or melting a powdered material. Once all the selected locations on the first layer are sintered or melted and then re-solidified, a new layer of powdered material is deposited on top of the completed layer, and the process is repeated layer by layer until the desired object is produced.

SUMMARY

In one aspect, an additive manufacturing apparatus for forming an object includes a platen to support the object being formed, a dispensing system overlying the platen, and an energy source to apply energy to the powder dispensed on the top surface of the platen to form a fused portion of the powder. The dispensing system includes a powder source configured to hold powder to be dispensed over a top surface of the platen and a powder conveyor extending over the top surface of the platen. The powder conveyor includes a proximal end configured to receive the powder from the powder source. The powder conveyor is configured to move the powder carried within the powder conveyor along a length of the powder conveyor. The dispensing system also includes rings arranged coaxially along a longitudinal axis of the powder conveyor. The rings form a tube surrounding the powder conveyor and are configured to contain the powder. Each concentric ring includes at least one ring opening. The dispensing system also includes a cap plate extending along a length of the tube. The cap plate includes at least one cap plate opening. Each ring is configured to be independently rotatable such that the at least one ring opening of the respective concentric ring is movable into or out of alignment with the at least one cap plate opening. The powder is dispensed from the tube through the at least one ring opening and the at least one cap plate opening when the at least one ring opening and the at least one cap plate opening are aligned.

Features can include one or more of the following. The powder conveyor can be rotatable about the longitudinal axis of the powder conveyor to move the powder carried within the powder conveyor along the length of the powder conveyor. The powder conveyor can further include a screw conveyor coaxial with the longitudinal axis of the powder conveyor and rotatable about the longitudinal axis of the powder conveyor such that, when the screw conveyor rotates, the screw conveyor moves the powder carried within the powder conveyor along the length of the powder conveyor.

The screw conveyor can be configured such that when the screw conveyor rotates in a first direction about the longitudinal axis, the screw conveyor carries the powder along the longitudinal axis away from the proximal end of the powder conveyor. The screw conveyor can be further configured such that when the screw conveyor rotates in a second direction about the longitudinal axis, the screw conveyor carries the powder along the longitudinal axis toward the proximal end of the powder conveyor. The additive manufacturing apparatus can further include a motor to drive the screw conveyor and controller coupled to the motor. The controller can be configured to cause the screw conveyor to alternate between the rotation in the first direction and the second direction during dispensing of the powder to form the object. The screw conveyor can be configured to compact the powder when the screw conveyor rotates in the first direction. The controller can be configured to cause the screw conveyor to, prior to the dispensing, rotate in the first direction until powder extends along substantially all of the tube.

Each ring can include two or more positions spaced angularly around the ring, each position having one or more openings and having a distinct combination of a number of openings and opening size. Each ring can be movable between the positions such that a different position is aligned with the at least one cap plate opening. The combination can further define the at least one cap plate opening of each concentric ring. The combination can further include a number of openings of and a position of the at least one cap plate opening for each concentric ring.

A distal end of the powder conveyor can extend over the top surface of the platen. The distal end of the powder conveyor can be closed to prevent the powder from exiting the powder conveyor through the distal end. At least one cap plate opening can include a slot extending along a longitudinal axis of the cap plate. At least one cap plate opening can include two or more openings for each ring. The tube can surround the cap plate, or the cap plate can surround the tube.

A drive system of each concentric ring can include a motor with a rotational axis offset from and parallel to the longitudinal axis of the powder conveyor. The drive system can further include a linkage system connected to the motor such that rotation of the motor about its rotational axis causes rotation of the concentric ring about the longitudinal axis of the powder conveyor. The motor of the drive system of each of the concentric rings can include a distinct shaft length. A drive system of each concentric ring can include a solenoid configured to generate an electromagnetic field to rotate the concentric ring about the longitudinal axis of the auger conveyor.

The dispensing system can be a first dispensing system. The powder can be a first powder. The additive manufacturing apparatus can further include a second dispensing system configured to receive a second powder to be dispensed over the top surface of the platen. The second powder can include a diameter small than a diameter of the first powder.

The energy source can include heaters configured to apply the energy to the powder. The heater can be addressable such that that the energy is selectively applied to the powder dispensed through the at least one ring opening and the concentric at least one cap plate opening.

In a further aspect, a dispensing system includes a powder source configured to hold powder to be dispensed over a top surface of a platen. The dispensing system further includes a powder conveyor extending over the top surface of the platen. The powder conveyor includes a proximal end configured to receive the powder from the powder source. The powder conveyor is configured to move the powder carried within the powder conveyor along a length of the powder conveyor. The dispensing system includes rings arranged coaxially along a longitudinal axis of the powder conveyor. The rings form a tube surrounding the powder conveyor and configured to contain the powder. Each concentric ring includes at least one ring opening. The dispensing system includes a cap plate extending along a length of the tube. The cap plate includes at least one cap plate opening. Each ring is configured to be independently rotatable such that the at least one ring opening of the respective concentric ring is movable into or out of alignment with the at least one cap plate opening. The powder is dispensed from the tube through the at least one ring opening and the at least one cap plate opening when the at least one ring opening and the at least one cap plate opening are aligned.

Advantages of the foregoing may include, but are not limited to, the following. The efficiency of forming an object and increase overall throughput of additive manufacturing can be increased. The dispensing system can include several paths through which powder can be dispensed in parallel onto a platform of the additive manufacturing apparatus. These multiple available paths can be independently controlled such that the placement of powder onto the build platform can be controlled.

The details of one or more implementations of the subject matter described in this specification are set forth in the accompanying drawings and the description below. Other potential features, aspects, and advantages will become apparent from the description, the drawings, and the claims.

BRIEF DESCRIPTION OF THE DRAWINGS

FIG. 3C is an enlarged front-side perspective cross-sectional view of the dispensing system of FIG. 3A.

Like reference numbers and designations in the various drawings indicate like elements.

DETAILED DESCRIPTION

Additive manufacturing (AM) apparatuses can form an object by dispensing and fusing successive layers of a powder on a build platform. Control of the area on the build stage on which powder is dispensed is desirable. For example, a controllable dispenser can permit control of the geometry of the object, or simply be used to avoid dispensing powder in areas of the build platform that will not support the object, thus reducing the consumption of powder.

The dispensing system described below can include controllable and movable structures that enable the apparatus to selectively dispense the powder on the build platform. Optionally, the dispensing system's controllable and movable structures also enable control of the powder dispensing rate, which can be selected to be low for localized and precise dispensing or can be selected to be high for high-throughput dispensing.

Additive Manufacturing Apparatuses

Figure 1A:
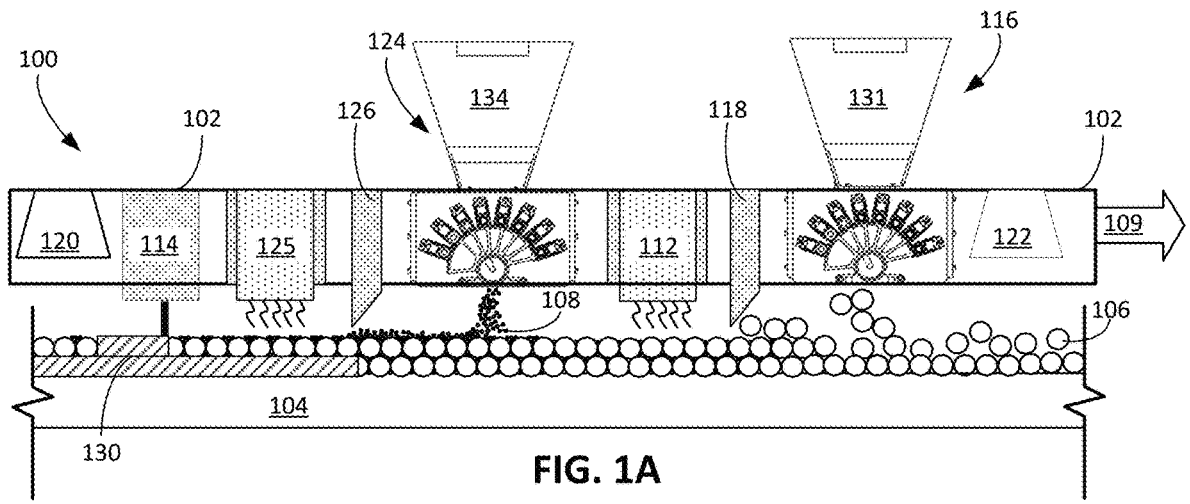
FIG. 1A is a schematic side view of an example of an additive manufacturing apparatus.

FIG. 1A shows a schematic side view of an example additive manufacturing (AM) apparatus 100 that includes a dispensing system for dispensing of powder to form an object during a build operation. The apparatus 100 includes a printhead 102 and a build platform 104 (e.g., a build stage). The printhead 102 dispenses a powder 106 and, optionally, fuses the powder 106 dispensed on the platform 104. Optionally, as described below, the printhead 102 can also dispense and/or fuse a second powder 108 on the platform 104.

Figure 1B:
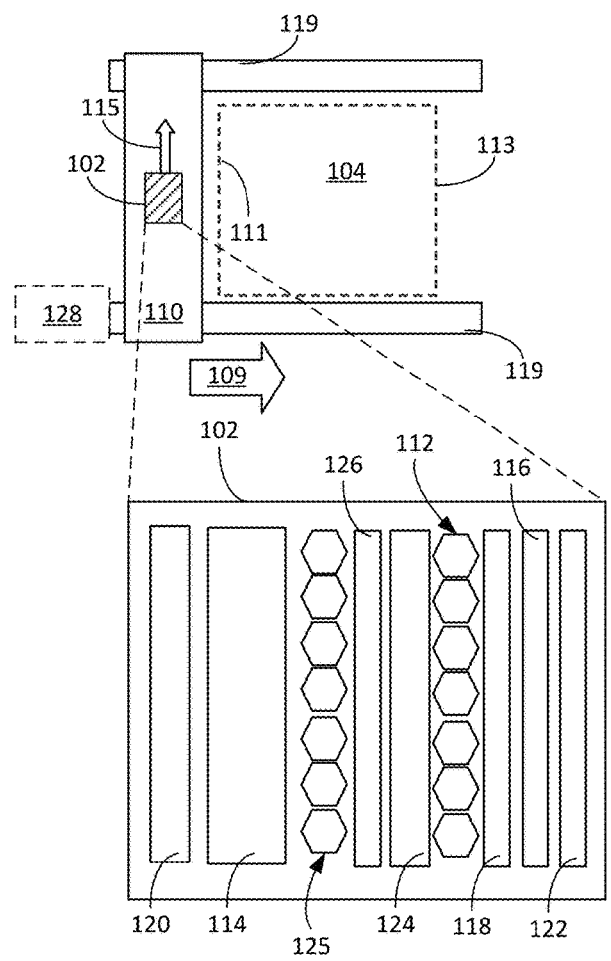
FIG. 1B is a schematic top view of the additive manufacturing apparatus of FIG. 1A.

Referring to FIGS. 1A and 1B, the printhead 102 is supported on a gantry 110 (e.g., a platform, a support) configured to traverse the platform 104. The gantry 110 can include a horizontally extending support on which the printheads are mounted. For example, the gantry 110 can be driven along rails 119 by a linear actuator and/or motor so as to move across the platform 104 along a first axis parallel to a forward direction 109. In some implementations, the printhead 102 can move along the gantry 110 along a horizontal second axis 115 perpendicular to the first axis. Movement along both the first and second axes enables the printhead 102 and its systems to reach different parts of the platform 104 beneath the gantry 110. The movement of the printhead 102 along the gantry 110 and the movement of the gantry 110 along the rails 119 provide multiple degrees of freedom of mobility for the printhead 102. The printhead 102 can move along a plane above and parallel to the build platform 104 such that the printhead 102 can be selectively positioned above a usable area of the build platform 104 (e.g., an area where the powder can be dispensed and fused).

The printhead 102 and the gantry 110 can cooperate to scan the usable area of the build platform 104, enabling the printhead 102 to dispense powder along the build platform 104 as needed to form the object. In the example as shown in FIG. 1B, the printhead 102 can scan in the forward direction 109 along the build platform 104. After the printhead 102 travels across the build platform 104 from a first end 111 to a second end 113 of the build platform 104 for a first time to deposit a first stripe of the layer of powder. Then the printhead 102 can return to the first end 111, move in a lateral direction along the horizontal second axis 115, and begin a travel across the build platform 104 again in the forward direction 109 for a second time to deposit a second stripe on the build platform 104 that is parallel to the first stripe. If the printhead 102 dispenses two or more different sizes of powder, the printhead 102 can dispense the two or more different powders during a single pass across the platform 104.

Alternatively, the gantry 110 can include two or more printheads that span the width of the platform 104. In this case, motion of the printhead 102 in the lateral direction along the horizontal second axis 115 may not be needed.

Figure 2:
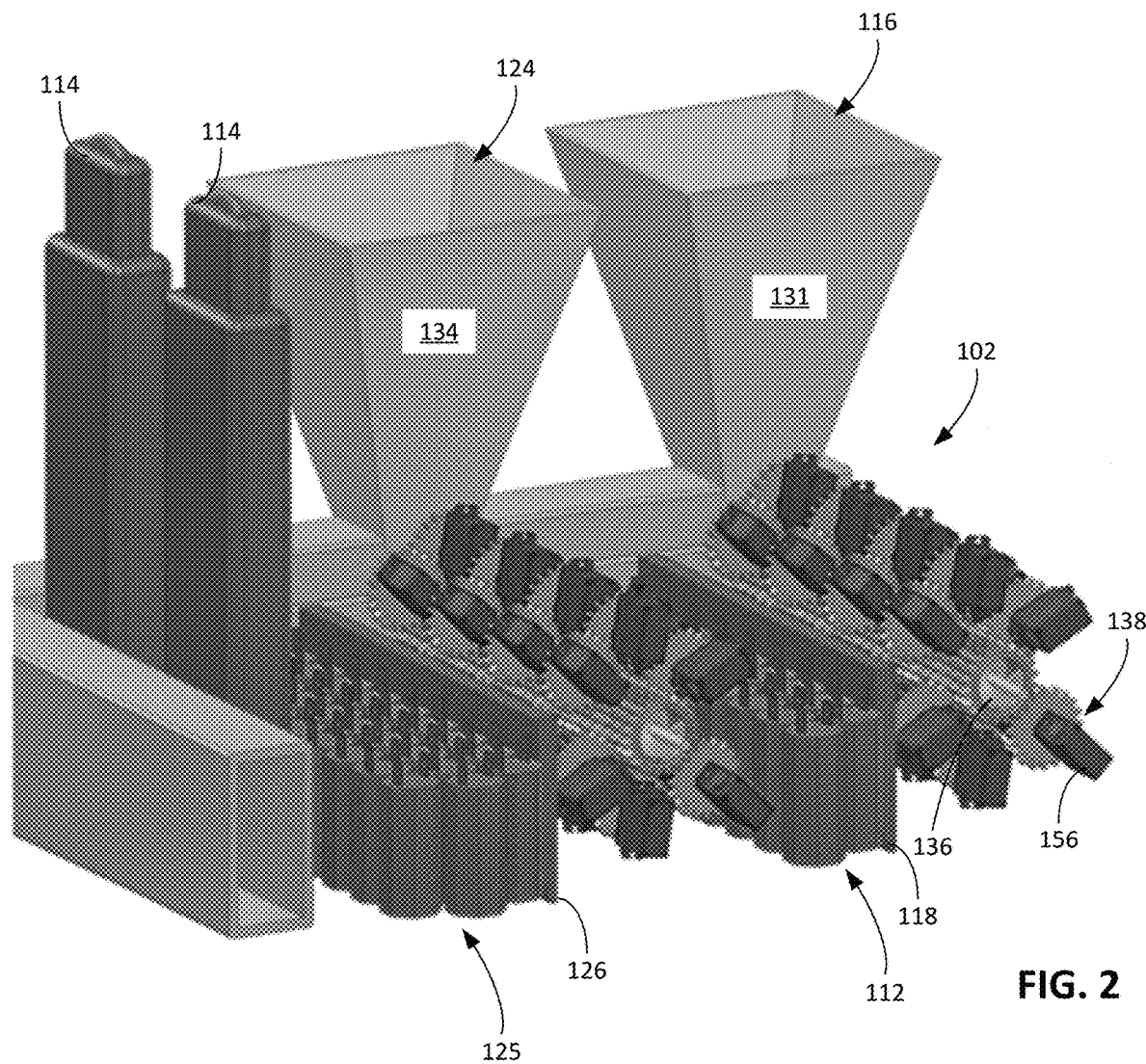
FIG. 2 is a front perspective cutaway view of a printhead.

Referring to FIG. 1A and to FIG. 2, which shows a cutaway view of the printhead 102 the printhead 102 includes at least a first dispensing system 116 to selectively dispense powder 106 on the build platform 104.

The apparatus 100 also includes an energy source 114 to selectively add energy to the layer of powder on the build platform 104. The energy source 114 can be incorporated into the printhead 102, mounted on the gantry 110, or be mounted separately, e.g., on a frame supporting the build platform 104 or on chamber wall that surrounds the build platform 104.

In some implementations, the energy source 114 can include a scanning laser that generates a beam of focused energy that increases a temperature of a small area of the layer of the powder. The energy source 114 can fuse the powder by using, for example, a sintering process, a melting process, or other process to cause the powder to form a solid mass of material. In some cases, the energy source 114 can include an ion beam or an electron beam.

The energy sources 114 can be positioned on the printhead 102 such that, as the printhead 102 advances in the forward direction 109, the energy sources can cover lines of powder dispensed by the dispensing system 116. When the apparatus 100 includes multiple dispensing systems, the printhead 102 can also optionally include an energy source for each of the dispensing systems. If the apparatus includes multiple heat sources, the energy sources can each be located immediately ahead of one of the heat sources.

Optionally, the apparatus can include a heat source 112 to direct heat to raise the temperature of the deposited powder. The heat source 112 can heat the deposited powder to a temperature that is below its sintering or melting temperature. The heat source 112 can be, for example, a heat lamp array. The energy source 114 can be incorporated into the printhead 102, mounted on the gantry 110, or be mounted separately, e.g., on a frame supporting the build platform 104 or on chamber wall that surrounds the build platform 104. The heat source 112 can be located, relative to the forward moving direction 109 of the printhead 102, behind the first dispensing system 116. As the printhead 102 moves in the forward direction 109, the heat source 112 moves across the area where the first dispensing system 116 was previously located.

In some implementations, the heat source 112 is a digitally addressable heat source in the form of an array of individually controllable light sources. The array includes, for example, vertical-cavity surface-emitting laser (VCSEL) chips, positioned above the platform 104. The array can be within the printhead 102 or be separate from the printhead 102. The array of controllable light sources can be a linear array driven by an actuator of a drive system to scan across the platform 104. In some cases, the array is a full two-dimensional array that selectively heats regions of the layer by activating a subset of the individually controllable light sources. Alternatively or in addition, the heat source includes a lamp array to simultaneously heat the entire layer of the powder. The lamp array can be part of the printhead 102 or can be an independent heat source unit that is part of the apparatus 100 but separate from the printhead 102.

In some implementations, the build platform 104 may include a heater that can heat powder dispensed on the build platform 104. The heater can be an alternative to or in addition to the heat source 112 of the printhead 102.

Optionally, the printhead 102 and/or the gantry 110 can also include a first spreader 118, e.g., a roller or blade, that cooperates with first the dispensing system 116 to compact and spread powder dispensed by the dispensing system 116. The spreader 118 can provide the layer with a substantially uniform thickness. In some cases, the first spreader 118 can press on the layer of powder to compact the powder.

The printhead 102 and/or the gantry 110 can also optionally include a first sensing system 120 and/or a second sensing system 122 to detect properties of the apparatus 100 as well as powder dispensed by the dispensing system 116.

In some implementations, the printhead 102 includes a second dispensing system 124 to dispense the second powder 108. A second spreader 126 can operate with the second dispensing system 124 to spread and compact the second powder 108. The apparatus 100, e.g., the printhead 102 or the gantry 110, can also include a second heat source 125 that, like the first heat source 112, directs heat to powder in large areas of the build platform 104.

A controller 128 can coordinate the operations of the energy source 114, heat source 112 (if present), and dispensing system 116. The controller 128 can operate the dispensing system 116 to dispense the powder 106 and can operate the energy source 114 and the heat source 112 to fuse the powder 106 to form a workpiece 130 that becomes the object to be formed.

The controller 128 can operate the first dispensing system 116 to control, for example, the thickness and the distribution of the powder 106 dispensed on the build platform 104. The thickness of each layer depends on, for example, the number of the powder particles 106 stacked through a height of the layer or the mean diameter of the powder particles 106. In some implementations, each layer of the powder particles 106 is a single particle thick. In some cases, each layer has a thickness resulting from stacking multiple powder particles 106 on top of each other.

In some implementations, the height of the layer also depends on a distribution density of the powder particles 106, e.g., how closely packed the powder particles 106 are. A level of compaction of the powder 106 can affect the thickness of each layer dispensed. Higher levels of compaction of the powder 106 can reduce the thickness of the layer dispensed as compared to a layer formed with the same number of particles at a lower level of compaction. The higher level of compaction can further increase a uniformity of the thickness across the layer and reduce the laser residency time need to melt the layer. The thickness of each layer and the compaction of the powder can be selected to control a desired resolution for the geometry of the portion of the object being formed in that layer.

The distribution of powder dispensed for each layer, e.g., the locations of the powder within each layer, can vary based on the implementation of the additive manufacturing apparatus. In some cases, the first dispensing system 116 can selectively dispense a layer of powders across the build stage such that some portions include powder and some portions do not include powder. In some implementations, the first dispensing system 116 can dispense a uniform layer of materials on the work surface.

Referring to FIG. 2, the first dispensing system 116 receives the powder 106 in a powder hopper 131. The powder 106 then travels through a channel 136. The powder hopper 131 can be filled with powder such that the powder hopper 131 serves as a powder source for the channel 136 during a dispensing operation. The first dispensing system 116 dispenses the powder 106 onto the build platform 104 through one or more of several available openings or holes extending from the channel 136. The holes or openings can be selectively openable. In particular, the channel 136 can be formed by selectively controllable and movable rings, e.g., rotatable rings, that include the openings. The rings, together when stacked along their common central cylindrical axis, can be in the shape of a tube with the channel 136 corresponding to the aperture through the tube. As the rings rotate, the openings move angularly around the common cylindrical axis.

The controller 128 can selectively actuate ring drive mechanisms 138 to control the ring through which powder is dispensed. In cases where each ring includes multiple openings, the controller can also actuate each of the ring drive mechanisms 138 to select one or more of the multiple openings through which to dispense powder.

Each group of opening at a particular angular location on a ring can be sized and dimensioned such that the powder is dispensed at a different rate. The rotation of the rings, and hence, the selection of the opening or openings through which the powder is dispensed, enable the controller 128 to select a rate at which the powder is dispensed onto the build platform 104.

Using the first dispensing system 116, the controller can control the powder's distribution on the build platform 104 and distribution. The first dispensing system 116 can control a distribution of the powder in a layer dispensed on the build platform 104 or on an uppermost layer of powder. In some cases, the first dispensing system 116 can dispense the powder through one of the openings to achieve selective dispensing of the powder onto the build platform 104 or the uppermost layer of powder. In some cases, the first dispensing system 116 can dispense the powder through more than one opening (e.g., through a hole in each of the rings) so that the first dispensing system 116 can dispense powder across a larger area of the build platform 104 at once.

The first spreader 118 can then spread the powder across the build platform 104. The spreader can provide the layer with a substantially uniform thickness. In some implementations, the first spreader 118 is a blade that translates across the platform 104. In some cases, the first spreader 118 is a roller or rotating cylinder that rolls across the platform 104. The spreader 118 can roll in a clockwise direction and/or a counterclockwise direction.

Optionally, the printhead can include a second dispensing system 124 to deliver a second powder. The second dispensing system 124 receives the powder 108 in a powder hopper 134. The powder 108 then travels through a channel 136. Similar to the first dispensing system 116, the second dispensing system 124 can control the rate at which powder is dispensed through the build platform 104 by rotating rings containing holes through which the powder is dispensed. The second dispensing system 124 can also compact the powder so that powder dispensed from the first dispensing system 116 has a desired distribution density.

If present, the second dispensing system 124 enables delivery of a second type of powder 108 having properties different than the first powder 106. The first powder particles 106 can have a larger mean diameter than the second powder particles 108, e.g., by a factor of two or more. When the second powder particles 108 are dispensed on a layer of the first powder particles 106, the second powder particles 108 infiltrate the layer of first powder particles 106 to fill voids between the first powder particles 106. The second powder particles 108, being smaller than the first powder particles 106, can achieve a higher resolution, higher pre-sintering density, and/or a higher compaction rate.

Alternatively or in addition, if the apparatus 100 includes two types of powders, the first powder particles 106 can have a different sintering temperature than the second powder particles. For example, the first powder can have a lower sintering temperature than the second powder. In such implementations, the energy source 114 can be used to heat the entire layer of powder to a temperature such that the first particles fuse but the second powder does not fuse.

In some implementations, the controller 128 can control the first and second dispensing systems 116, 124 to selectively deliver the first and the second powder particles 106, 108 to different regions.

In implementations when multiples types of powders are used, the first and second dispensing systems 116, 124 can deliver the first and the second powder particles 106, 108 each into selected areas, depending on the resolution requirement of the portion of the object to be formed.

Materials for the powder include metals, such as, for example, steel, aluminum, cobalt, chrome, and titanium, alloy mixtures, ceramics, composites, and green sand. In implementations with two different types of powders, in some cases, the first and second powder particles 106, 108 can be formed of different materials, while, in other cases, the first and second powder particles 106, 108 have the same material composition. In an example in which the apparatus 100 is operated to form a metal object and dispenses two types of powder, the first and second powder particles 106, 108 can have compositions that combine to form a metal alloy or intermetallic material.

If the apparatus 100 dispenses two different types of powders having different sintering temperatures, the first and second heat sources 112, 125 can have different temperature or heating set points. For example, if the first powder 106 can be sintered at a lower temperature than the second powder 108, the first heat source 112 may have a lower temperature set point than the second heat source 125.

In some implementations, the building platform 104 is fixed and the printhead 102 moves in a vertical direction to dispense successive layers of the powder. In some implementations, the build platform 104 can be moved upward or downward during build operations. For example, the build platform 104 can be moved downward with each layer dispensed by the first dispensing system 116 so that the printhead 102 can remain at the same vertical height with each successive layer dispensed. The controller 128 can operate a drive mechanism, e.g., a piston or linear actuator, connected to the build platform 104 to decrease a height of the build platform 104 so that the build platform 104 can be moved away from the printhead 102. Alternatively, the build platform 104 can be held in a fixed vertical position, and the gantry 110 can be raised after each layer is deposited.

The controller 128 controls the operations of the apparatus 100, including the operations of the printhead 102 and its subsystems, such as the heat source 112, the energy source 114, and the first dispensing system 116. The controller 128 can also control, if present, the first spreader 118, the first sensing system 120, the second sensing system 122, the second dispensing system 124, and the second spreader 126. The controller 128 can also receive signals from, for example, user input on a user interface of the apparatus or sensing signals from sensors of the apparatus 100.

The controller 128 can include a computer aided design (CAD) system that receives and/or generates CAD data. The CAD data is indicative of the object to be formed, and, as described herein, can be used to determine properties of the structures formed during additive manufacturing processes. Based on the CAD data, the controller 128 can generate instructions usable by each of the systems operable with the controller 128, for example, to dispense the powder 106, to fuse the powder 106, to move various systems of the apparatus 100, and to sense properties of the systems, powder, and/or the workpiece 130.

The controller 128, for example, can transmit control signals to drive mechanisms that move various components of the apparatus. In some implementations, the drive mechanisms can cause translation and/or rotation of these different systems, including dispensers, rollers, support plates, energy sources, heat sources, sensing systems, sensors, and other components of the apparatus 100. Each of the drive mechanisms can include one or more actuators, linkages, and other mechanical or electromechanical parts to enable movement of the components of the apparatus.

The controller 128, in some cases, controls movement of the printhead 102 and can also control movements of individual systems of the printhead 102. For example, the controller 128 can cause the printhead 102 to move to a particular location along the gantry 110, and the controller 128 can transmit a separate control signal to drive a separate drive mechanism to move the energy source 114 of the printhead 102 along the printhead 102. The apparatus 100 can further include a drive mechanism that moves the gantry 110 along the build platform 104 so that the printhead 102 can be positioned above different areas of the build platform 104.

The controller 128 can also control individual structures of the dispensing system 116, including the movable and controllable rings described herein and a powder conveyor contained within the dispensing system 116. The controller 128 can control the dispensing system 116 to adjust delivery rates of the powder, a level of compaction of the powder, as well as the locations on the build platform 104 where the powder is dispensed.

Dispensing Systems

FIGS. 3A to 3G depict various views of the dispensing system 116 (and/or, e.g., the second dispensing system 124). As shown in the perspective view of the dispensing system 116 shown in FIG. 3A, the dispensing system 116 includes the powder hopper 131 to receive powder to be dispensed (and possibly compacted) by the dispensing system 116.

Figure 3A:
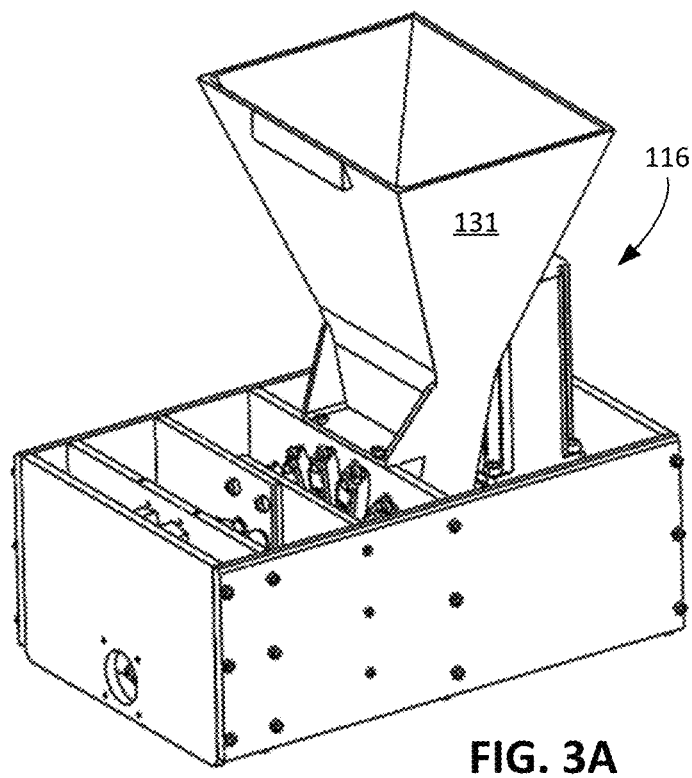
FIG. 3A is a front-side perspective view of a dispensing system.
Figure 3B:
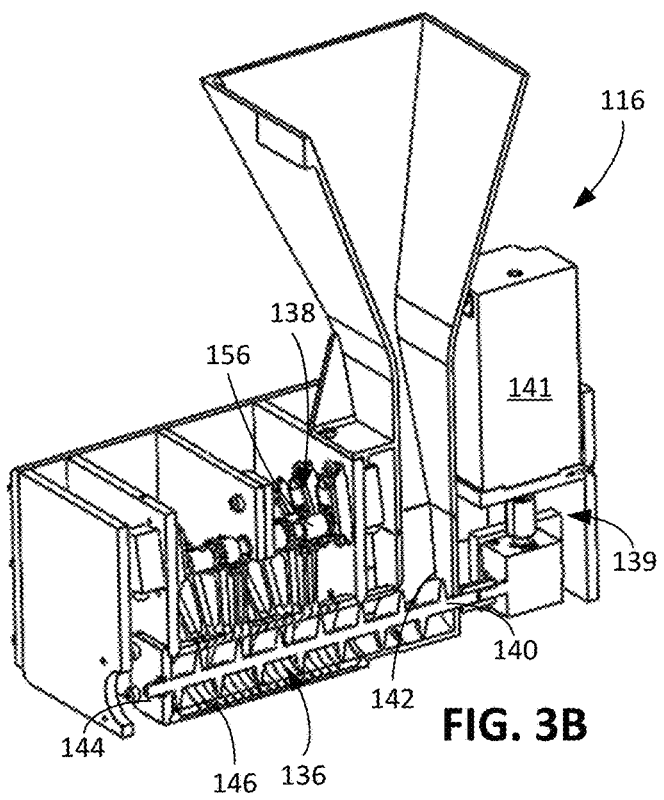
FIG. 3B is a front-side perspective cross-sectional view of the dispensing system of FIG. 3A.

Also referring to FIG. 3B depicting a perspective cross-sectional view of the dispensing system 116, powder travels through the powder hopper 131 into the channel 136. A conveyor drive mechanism 139 of the dispensing system 116 can drive a powder conveyor 140 that causes the powder to move between an entrance 142 of the channel 136 and a closed end 144 of the channel 136. The powder conveyor 140 can be an auger screw.

The conveyor 140 can rotate to carry the powder within the channel 136. For example, rotation of an auger screw can drive powder forward through the channel 136.

In some implementations, the conveyor 140, instead of rotating, translates along the channel 136 to distribute the powder within the channel 136. In some implementations, the conveyor 140 oscillates or vibrates to distribute the powder within the channel 136.

In some implementations, the conveyor drive mechanism 139 can include a drive motor 141. The drive motor 141 can be a high torque drive motor that enables the conveyor drive mechanism 139 to cause the conveyor 140 to exert high levels of pressure on powder within the channel 136. In some implementations, the drive mechanism 139 can further include gears, linkages, and other force and torque transfer devices that transfer the torque from the drive motor to the conveyor 140.

Referring to FIG. 3C, which shows an enlarged perspective cross-sectional view of the channel 136 of the dispensing system 116. A series of annular rings 146 encircle the conveyor 140. The apertures through the rings 146 define the channel 136 through which the powder travels. In particular, an inside surface of the rings 146 form the channel 136. Thus, as powder is travelling through the channel 136, the powder contacts the inside surface of the rings 146. The annular rings 146 each have a center that is concentric with a longitudinal axis 162 of the conveyor 140. In some implementations, the conveyor 140 rotates about this longitudinal axis 162 to move the powder through the channel 136.

Figure 4A:
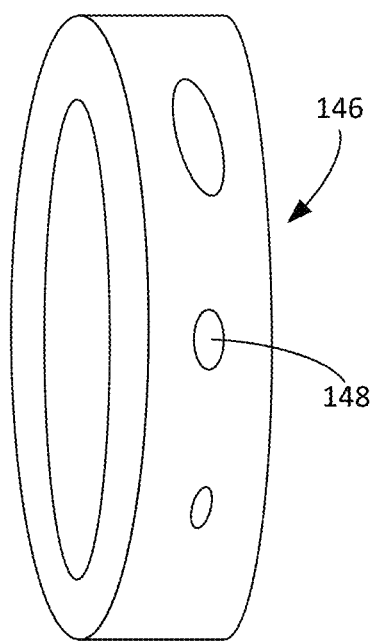
FIG. 4A is a bottom perspective view of a ring for a dispensing system.
Figure 4B:
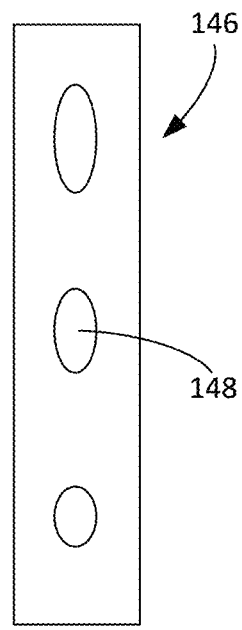
FIG. 4B is a bottom view of the ring of FIG. 4A.

As shown in FIGS. 4A and 4B, which are a bottom perspective view and a bottom view, respectively, of an example of the ring 146, each of the rings 146 includes an opening 148 that goes through the ring 146 from the inside surface to an outside surface of the ring 146.

In some implementations, each of the rings 146 includes multiple openings 148 spaced at different angular positions around the ring 146. The openings 148 can vary in size, shape, and quantity. For example, each of the rings 146 can include multiple openings of different sizes. In some cases, one or more of different angular positions on the ring 146 can include multiple openings. While three openings 148 are shown in FIGS. 4A and 4B, in some cases, a ring 146 could have just two, or four or more openings, each having a different size. Each ring can have the same pattern of openings. In some cases, the rings 146 each have a single opening 148 of the same size. For circular openings 148, the diameter of the openings 148 can be between, for example, 10 micrometers and 100 micrometers.

Figure 3D:
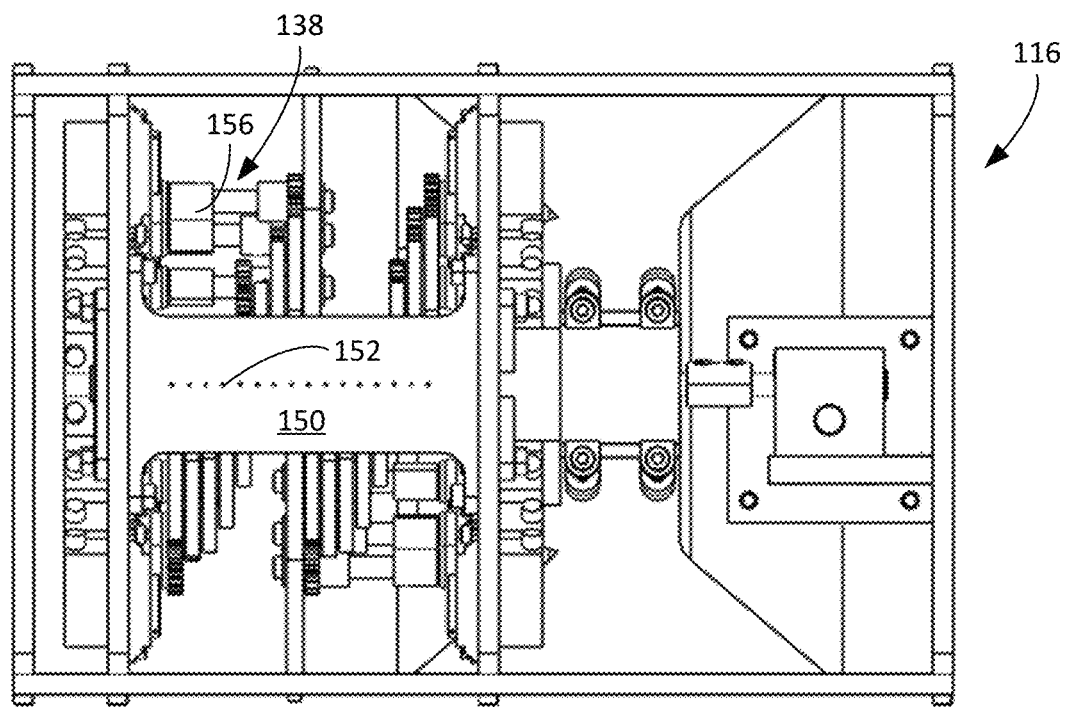
FIG. 3D is a bottom view of the dispensing system of FIG. 3A.

Also referring to FIG. 3D, showing a bottom view of the dispensing system 116, a cap plate 150 is positioned beneath the rings 146. The cap plate 150 extends along the channel 136 and extends along a combined length of the portion of the channel 136 provided by the rings 146. The cap plate includes openings 152. Each of the openings 152 of the cap plate 150 can correspond a different one of the rings 146. The openings can be arranged on line parallel to the longitudinal axis.

Figure 5A:
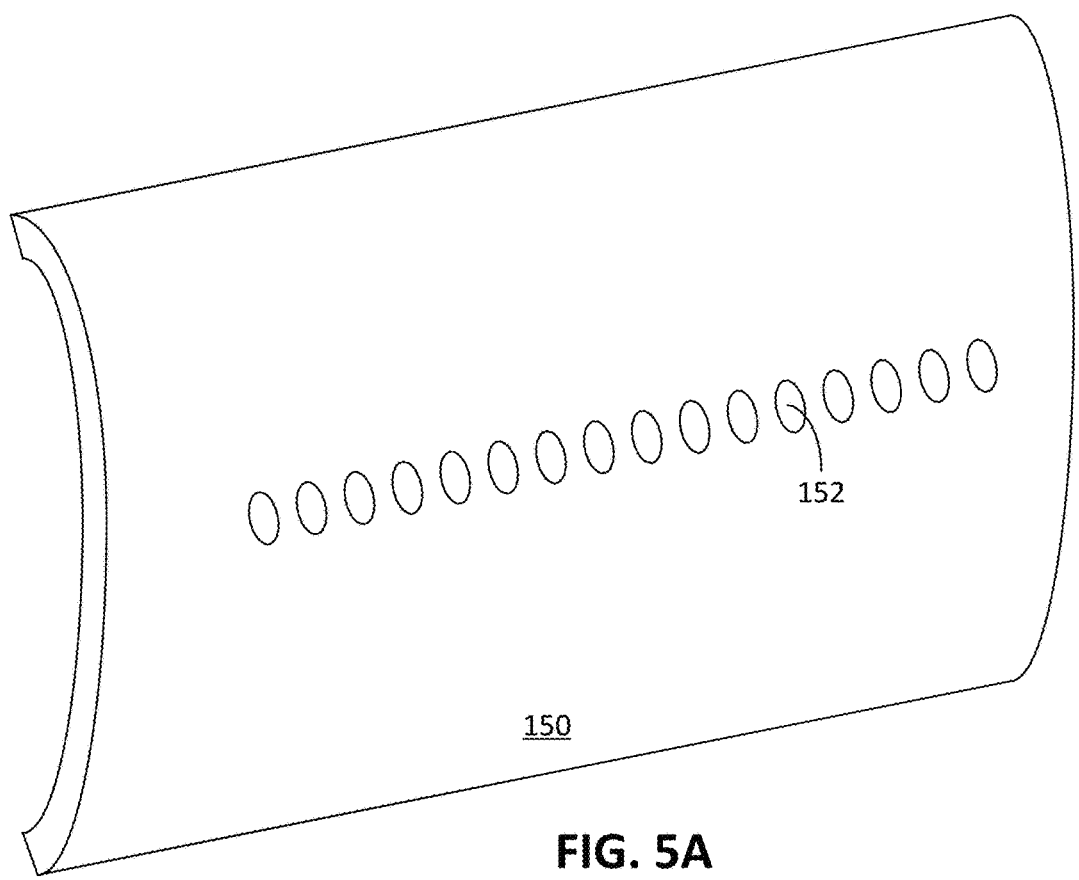
FIG. 5A is a bottom perspective view of a cap plate for a dispensing system.
Figure 5B:
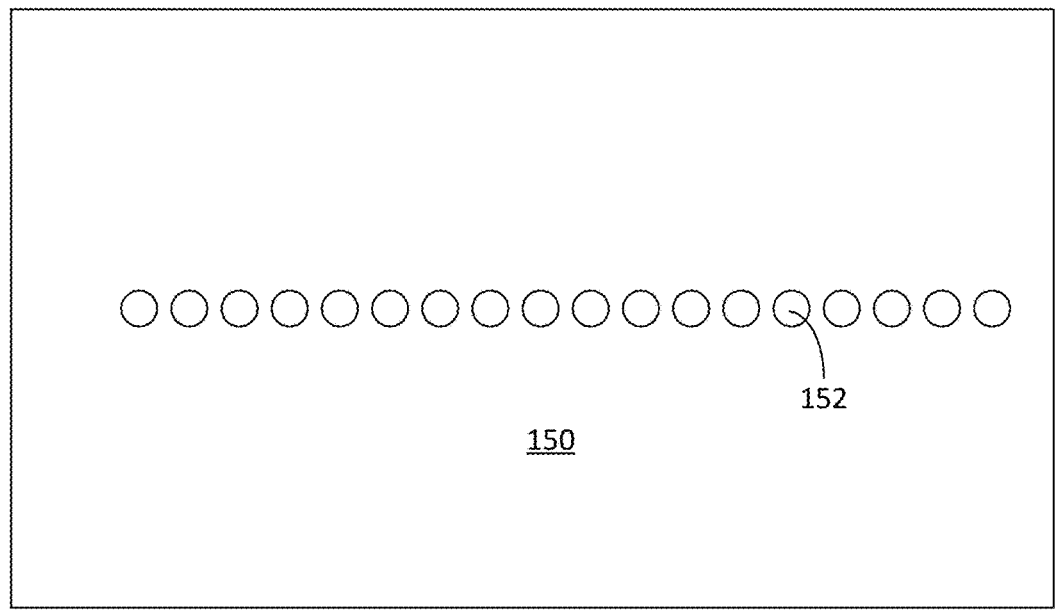
FIG. 5B is a bottom view of the cap plate of FIG. 5A.

Each opening 152 can be larger or smaller than the opening 148 of the corresponding ring 146. In some cases, as shown in FIGS. 5A and 5B, which show a bottom perspective view and a bottom view of an example of the cap plate 150, all of the openings 152 can have the same size. The openings 152 can be aligned with one another and evenly spaced apart.

While described as circular openings, the openings 148 and the openings 152 can be slots, slits, or other appropriate shapes. In some cases, the openings 148 and/or the openings 152 can be rectangular or oval. Although the cap plate 150 has been described to include several cap plate openings 152 with at least one cap plate opening for each ring 146, in some cases, the cap plate 150 includes a single slot that extends beneath all or several of the rings. The slot can extend parallel to the longitudinal axis of the channel. For example, the cap plate 150 could include two or more slots, each slot corresponding to two or more of the rings. In some cases, the cap plate includes one slot extending across all of the rings. In some implementations, the slot has a uniform width, while in other cases, the slots vary in width.

Figure 3E:
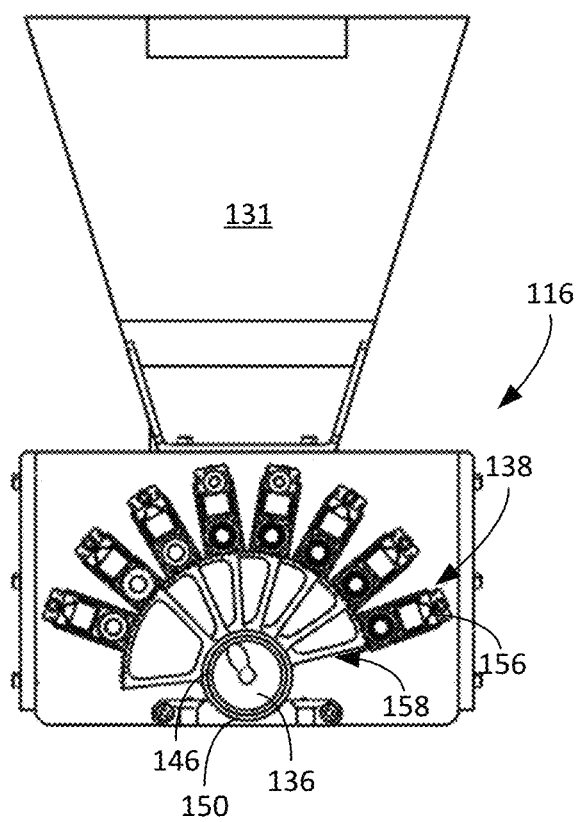
FIG. 3E is a front view of the dispensing system of FIG. 3A.
Figure 3F:
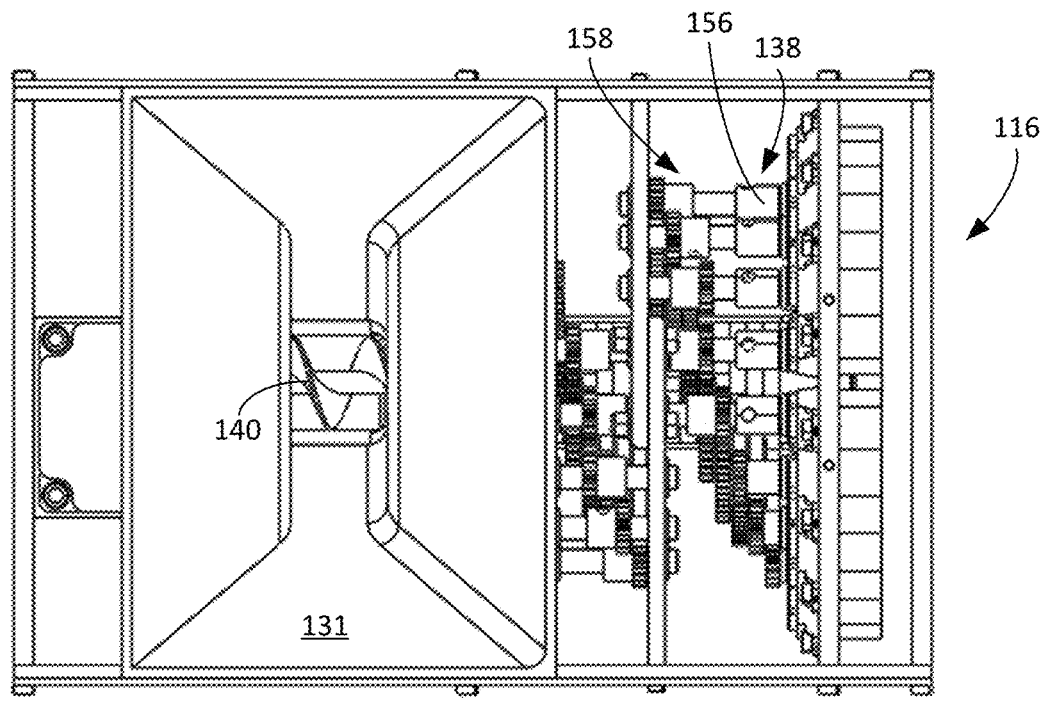
FIG. 3F is a top view of the dispensing system of FIG. 3A.

The rings 146 are adjacent to and above the cap plate 150, so the openings 148 of the rings 146 can be aligned with the openings 152 of the cap plate 150. In particular, each ring 146 can be rotated such that its opening 148 can align with its corresponding opening in the cap plate 150. FIG. 3E shows a front cross-sectional view of the dispensing system 116, and FIG. 3F shows a top cross-sectional view of the dispensing system 116. The dispensing system 116 includes ring drive mechanisms 138, each of which are connected to a corresponding one of the rings 146.

In some implementations, each of the ring drive mechanisms 138 can include a motor 156 and a linkage system 158 such that the motor can cause one of the rings 146 to rotate. The linkage system 158 can include gears, linkages, arms, and other force and torque transmitting elements to transfer the torque of the motor 156 into a rotational force on its associated ring 146. The motor 156 can be operated to rotate its associated ring 146 in both directions about its center. In some implementations, shaft lengths of the motors 156 can vary such that the motors 156 can each be mounted onto the same planar surface. In some implementations, each of the ring drive mechanisms 138 or each of the motors 156 can operate two or more of the rings 146 to rotate two or more of the rings simultaneously.

The ring drive mechanisms 138 rotate the rings 146 about the centers of the rings 146. The center of the rings 146 can coincide with the longitudinal axis 162 of the conveyor 140. Thus, as the rings 146 rotate, the channel 136 formed by the rings 146 can remain substantially the shape and size.

In some implementations, the rings are driven by a magnetic drive mechanism. The magnetic drive mechanism can rotate the rings. In some cases, the magnetic drive mechanism closes or opens an opening of the ring depending on a polarity of the magnetic drive mechanism. The magnetic drive mechanism can include a solenoid. The controller can control the solenoid to generate an electromagnetic field that interacts with magnetic or ferromagnetic material of one of the rings 146. The electromagnetic field can drive the ring 146 about the longitudinal axis 162 of the conveyor 140.

For each ring 146, the controller (e.g., the controller 128 of the apparatus 100 shown in FIG. 1B) can control the corresponding ring drive mechanism 138 of the ring 146 to set a rotational position of the ring 146. The rotational position of the ring 146 determines the position of the opening 148 of the ring 146 relative to the corresponding opening 152 of the cap plate 150. In the examples shown and described with respect to FIGS. 4A, 4B, 5A, and 5B, each ring 146 has multiple openings 148 and has one corresponding opening 152 in the cap plate 150.

The controller can operate one of the ring drive mechanisms 138 to dispense powder from the ring 146 associated with that ring drive mechanism 138. The controller can operate the ring drive mechanism 138 to rotate the ring 146 such that one of the openings 148 of the ring 146 aligns with its corresponding opening 152 in the cap plate 150. When the opening 148 is aligned with the corresponding opening 152, powder travelling through the channel 136 formed by the set of rings 146 can travel through the opening 148 and the corresponding opening 152. That powder can therefore travel through the cap plate 150 and can be dispensed onto the build platform (e.g., the build platform 104 of the apparatus 100 shown in FIGS. 1A and 1B).

The controller can also operate the ring drive mechanism 138 so that powder is not dispensed from the associated ring 146. The controller can also operate the ring drive mechanism 138 to rotate the ring 146 such that the openings 148 of the ring 146 are misaligned with their corresponding opening in the cap plate 150. When the openings 148 and 152 are misaligned, powder in the channel 136 is blocked by the body of the cap plate 150 and unable to pass through the ring 146, as their respective openings 148, 152 do not provide a path for the powder. The powder therefore is not dispensed from the portion of the channel 136 corresponding to that ring 146.

In cases where the ring 146 includes multiple openings 148 at different angular positions around the ring, the controller can select one of the openings 148 from among the several openings to align to the respective opening 152 to control a rate of the powder dispensed from the channel 136 through the ring 146. If the multiple openings 148 have different sizes as shown in FIGS. 4A and 4B, the larger sized openings can dispense powder at a greater rate than the smaller sized openings. Similarly, the smaller sized openings can dispense powder at a lower rate than the larger sized openings. To control the powder dispensing rate from the channel 136, the controller can select which of the openings 148, among the larger and smaller multiple openings 148, to align with the corresponding openings 152 of the cap plate 150.

In some implementations, the controller can cause partial alignment of the opening 148 and the corresponding opening 152 in the cap plate 150 to control the powder dispensing rate. In cases where the ring 146 has multiple openings 148, the controller can operate the ring drive mechanism 138 so that one of the openings 148 and the corresponding opening 152 in the cap plate 150 are in a partially aligned positions relative to one another. In the partially aligned positions, the opening 148 of the ring 146 and the opening 152 of the cap plate enable powder to be dispensed from the portion of the channel 136. However, the partial alignment can reduce the rate of powder dispensed from that portion of the channel 136 as compared to the rate of powder dispensed from that portion if the opening 148 and the corresponding opening 152 were in full alignment. Although the ring 146, for example as shown in FIGS. 4A and 4B, has three openings 148, the controller can select from more than three powder dispensing rates by partially aligning the openings 148 with the opening 152 in the cap plate.

In some implementations, the ring 146 may only have a single opening 148. In some implementations, even though the ring 146 only has a single opening, the controller can still modulate the powder dispensing rate by controlling an amount of alignment between the single opening 148 and the opening 152 of the cap plate 150. In some implementations in which the ring 146 has only a single opening, the controller is configured to simply provide a binary on/off state for dispensing of the powder.

The controller can also control the rotational position of each of the rings 146 for simultaneous dispensing powder from multiple rings 146. In particular, the controller can select multiple rings, and therefore multiple locations along the channel 136, from which the powder is dispensed. In some cases, the controller can dispense large amounts of powder across a wide area. In this regard, the controller can rotate several or all of the rings 146 such that their openings 148 are fully aligned with their corresponding openings 152. In this configuration, the controller can dispense powder from each of the openings 152 of the cap plate 150, thus enabling the dispensing system 116 to dispense large amounts of powder across a wide area.

In some cases, the controller can dispense a small amount of powder in a localized or limited area by dispensing powder from a subset of the rings 146. The controller can control the subset of the rings 146 so that their openings 148 are aligned with their corresponding openings 152 in the cap plate 150. For the remaining rings 146, the controller can control them such that their openings 148 are misaligned with the corresponding openings 152 in the cap plate 150. In this configuration, the dispensing system 116 dispenses powder only through those rings 146 who are in the positions in which their openings 148 are aligned with the corresponding openings 152 in the cap plate 150.

The conveyor 140, which moves the powder to be dispensed through the openings 152, can be an auger conveyor or screw conveyor with helical blades 160. The helical blades 160 can be helical screw blades. As the threads push the powder, the powder can travel along the channel 136. The helical blades 160 can rotate about a longitudinal axis 162 of the auger conveyor, which can be coincident with the centers of the rings 146. The conveyor drive mechanism 139 can provide the torque to rotate the auger conveyor. As the auger conveyor rotates, the helical blades 160 push the powder contained in the channel 136 so that the powder can travel through the channel 136. The auger conveyor can move the powder along the length of the auger conveyor. In this regard, the auger conveyor can move the powder and enable the powder to be dispensed from the different portions of the channel 136 along the length of the channel 136. These different portions can correspond to the different ring openings 148 and the different cap plate openings 152. In some implementations, the auger conveyor includes a lead screw in which the threads serve as the pushing surface for the powder.

The powder can be moved in both directions along the longitudinal axis 162 of the conveyor 140. For example, during a dispensing operation, the controller can control the auger conveyor to alternate directions of rotation. This back and forth motion can be more effective in dispensing the powder.

Figure 3G:
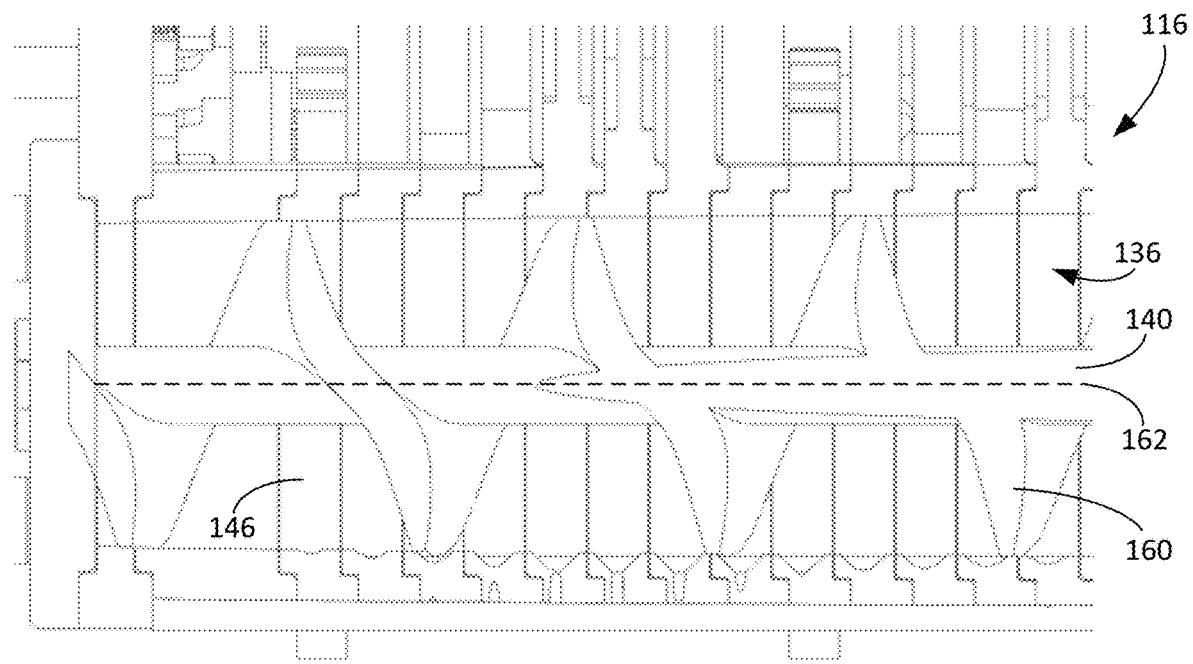
FIG. 3G is an enlarged top cutaway view of a powder conveyor for the dispensing system of FIG. 3A.

The controller, in some cases, can control the conveyor 140 to compact the powder before the powder is dispensed from the channel 136 onto the build platform. In some implementations, as shown in FIG. 3G, the end 144 of the conveyor 140 can be closed. When the channel 136 is filled with powder, the conveyor 140 can push the powder toward the end 144 without causing bulk movement of the powder. Rather, because the channel 136 is filled with the powder, the conveyor 140 can cause compaction of the powder.

While FIGS. 4A and 4B depict multiple ring openings 148 of varying sizes for a particular example of a ring 146 and FIGS. 5A and 5B depict one cap plate opening 152 for each ring 146, in other implementations, the combination of the number of ring openings, the number of corresponding cap plate openings per ring, the size of the ring openings, and the size of the cap plate openings may vary. While FIGS. 5A and 5B depict a uniform cap plate opening 152 for each ring 146, in some implementations, the cap plate opening or openings for each ring can vary in size and quantity from one another. For example, a set of cap plate openings for a single ring can include two or more cap plate openings while another set of cap plate openings for a single ring can include only a single cap plate opening.

FIGS. 6A to 6F show front cross-sectional views taken along a section line passing through a ring opening or ring openings and a cap plate opening or cap plate openings. These views thus depict the ring openings or openings for a particular ring 146 and the corresponding cap plate opening or openings in the cap plate 150 for that ring. The ring 146 rotates relative to the cap plate 150 about the longitudinal axis 162, e.g., the ring 146 rotates while the cap plate 150 remains stationary relative to the dispenser (the entire dispenser can be moving laterally across the build platform). As described in greater detail below, the rotation of the ring 146 enables powder to be dispensed from the portion of the channel 136 formed by the ring 146. Only one ring 146 is shown in each of these views, but the channel 136 is defined by a series of rings that may have ring openings of varying size and quantity.

Figure 6A:
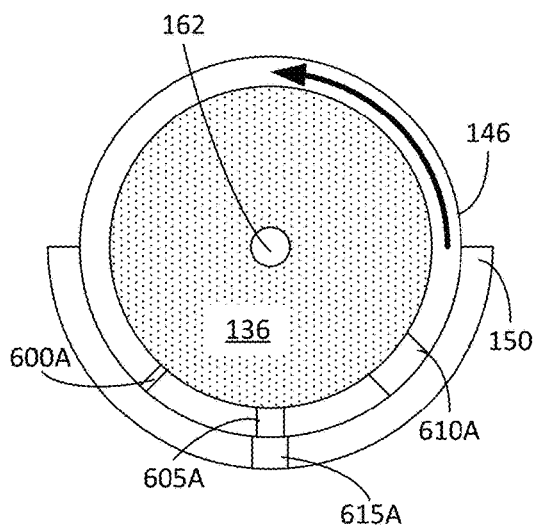
FIGS. 6A to 6F are front cross-sectional views of different configurations of a cap plate and a ring for a dispensing system.

In some implementations, the multiple ring openings 148 of a particular ring 146 are all smaller than the corresponding cap plate opening 152. The size of the ring openings 148 can thus determine the powder dispensing rate from the ring 146. In some cases, as shown in FIG. 6A, some of the ring openings of a ring 146 are smaller than the corresponding cap plate opening, while some of the ring openings of the ring 146 are larger than the corresponding cap plate opening 152. In particular, ring openings 600A and 605A are smaller than the cap plate opening 615A, and the ring opening 610A is larger than the cap plate opening 615A. When either the ring opening 600A or the ring opening 605A is aligned with the cap plate opening 615A, the powder dispensing rate can be proportional to a size of the ring openings 600A, 600B (e.g., an area of the openings 600A, 600B). In contrast, when the ring opening 610A is aligned with the cap plate opening 615A, because the cap plate opening 615A is smaller than the ring opening 610A, the powder dispensing rate is based on a size of the cap plate opening 615A. The cap plate opening 615A can thus determine an upper limit for a powder dispensing rate.

Figure 6B:
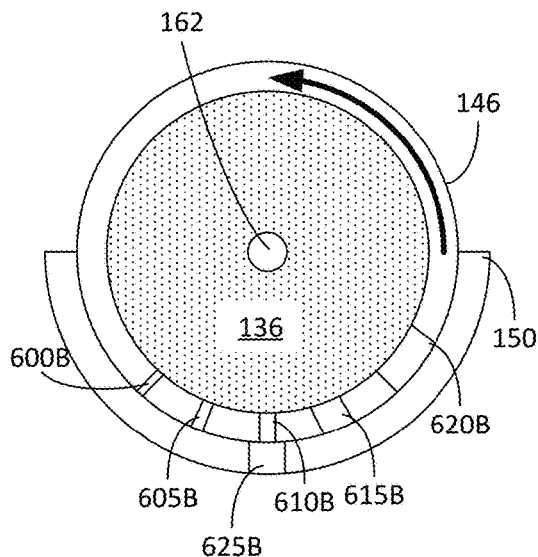

In some implementations, as shown in FIG. 6B, the number of ring openings can be more than three. For example, the ring 146 can have five ring openings, in particular, the ring openings 600B, 605B, 610B, 615B, 620B. The ring openings each have a different size. FIG. 6B depicts the ring openings 600B, 605B, 610B, 615B as being smaller than the cap plate opening 625B in the cap plate 150. And, the ring opening 620B is larger than the cap plate opening 625B. In this example, while the cap plate opening 625B is smaller than the largest ring opening 620B, for other rings in the dispensing system, the largest ring opening may be smaller than the cap plate opening. For other rings in the dispensing system, one, two, three, four, or all of the ring openings may be smaller than the cap plate opening.

Figure 6C:
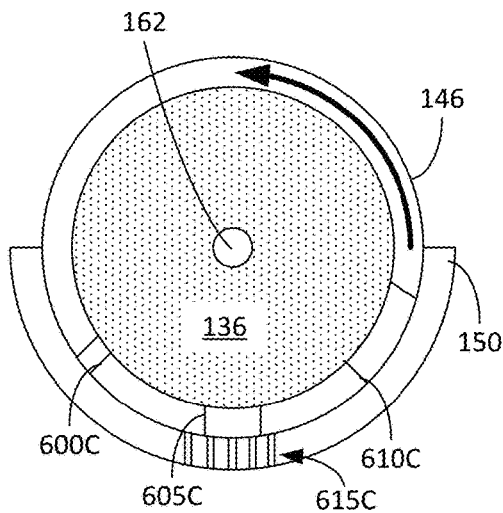

While the examples described with respect to FIGS. 3A to 3G indicate that the controller controls one ring opening to align, misalign, or partially align with one cap plate opening, in some cases, the controller can control a ring opening to align with two or more cap plate openings. As shown in FIG. 6C, the ring 146 has three ring openings 600C, 605C, 610C, and the cap plate 150 has a set 615C of five cap plate openings. Each of the cap plate openings can have the same size.

When the ring opening 605C is aligned with the set 615C of the cap plate openings to dispense powder as shown in FIG. 6C, the ring opening 605C can align with three of the cap plate openings of the set 615C. When the ring opening 600C is aligned with the cap plate openings, the ring opening 600C can align with one of the cap plate openings of the set 615C. When the ring opening 610C is aligned with the cap plate openings, the ring opening 610C can align with five of the cap plate openings of the set 615C. The controller can thus control the powder dispensing rate from ring 146 based on the number of cap plate openings aligned with one of the ring openings.

In some cases, the ring 146 only has one opening that can align with all available cap plate openings of the set 615C. For example, the ring 146 could have only the largest ring opening 610C. Rather than partially aligning the ring 146 with a single opening as described with respect to FIGS. 3A to 3G, the controller can control the ring 146 to align the ring opening 610C with one or more of the cap plate openings of the set 615C. The controller can select the number of cap plate openings aligned with the ring opening 610C to control the powder dispensing rate through the ring 146.

Figure 6D:
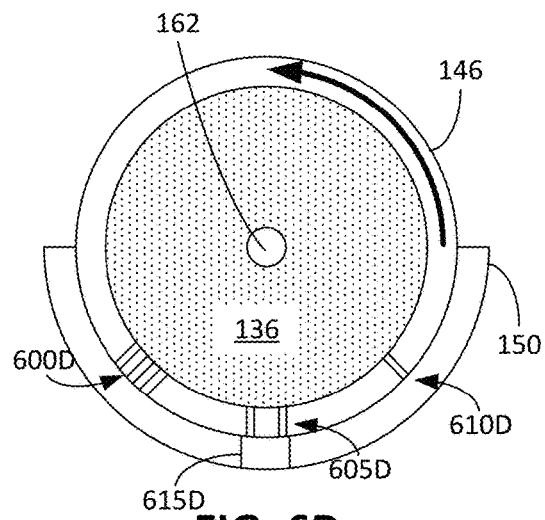

In some implementations, instead of ring openings of varying size within a single ring, the ring 146 could have ring openings of the same size. As shown in FIG. 6D, the ring openings can be arranged into multiple sets 600D, 605D, and 610D of ring openings. Each one of the sets can be aligned with the cap plate opening 615D. In the example depicted in FIG. 6D, each of the sets 600D, 605D, 610D have ring openings spaced apart and sized such that alignment with the cap plate opening 615D enables all of the ring openings to dispense powder through the cap plate opening 615D. To control a powder dispensing rate, the controller can control which of the sets 600D, 605D, 610D to align with the cap plate opening 615D. In some implementations, some of the ring openings within a set can be blocked by the cap plate 150.

Figure 6E:
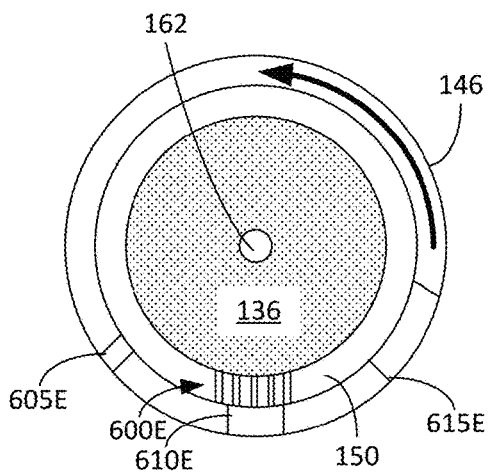

While the ring 146 has been described to be contained within or above the cap plate 150 or the cap plate 150 has been described to encircle the ring 146, in some implementations, the ring 146 can surround the cap plate 150. In some cases, the cap plate 150, rather than being a half-tube, the cap plate is a plate with cap plate openings or a beam with cap plate openings. In some implementations, the cap plate 150 is a full tube that is encircled by the series of rings 146. For example, as shown in FIG. 6E, the cap plate 150 is a full tube encircled by the rotating ring 146. The cap plate includes a set 600E of cap plate openings, and the ring 146 includes three ring openings 605E, 610E, 615E. In contrast to the examples described with respect to FIGS. 3A to 3G and elsewhere, in the example of FIG. 6E, when the ring openings 605E, 610E, 615E are misaligned with the set 600E of cap plate openings, the ring 146 blocks the powder from being dispensed from the channel 136.

Figure 6F:
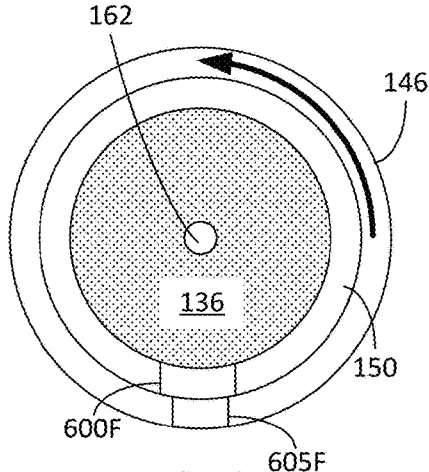

In another example, as shown in FIG. 6F, the ring 146 has a single opening 600F and the cap plate 150 has a single opening 605F. The ring 146 also encircles the cap plate 150. The controller can control the amount of the ring opening 600F aligned with the cap plate opening 605F to control a powder dispensing rate from the ring 146.

These different examples depicted in and described with respect to FIGS. 6A to 6F, while not limiting to the scope of the number of combinations possible with regards to opening size and quantity, illustrate examples of combinations different sizes and quantities of ring openings and cap plate openings.

The dispensing systems described herein (e.g., the first dispensing system 116 of FIGS. 1A and 1B) can be operated to provide parallel dispensing of the powder through multiple holes The dispensing system can also selectively dispense through a subset of the holes to dispense powder in a localized area within a layer. The selective dispensing of the powder can enable the additive manufacturing apparatus to reduce powder use in cases where the object to be formed does not span the entire build platform. By having individual control of the holes, the dispensing system can rapidly dispense layers of the powder while still achieving selective dispensing.

Operations of the Dispensing Systems

The dispensing systems described herein facilitate dispensing and compaction of powder onto the build platform of the apparatus. Referring to FIG. 1A, 1B, the controller 128 can operate the apparatus 100, and in particular, the dispensing system 116 to control the dispensing and compacting operations. The controller 128 can receive signals from, for example, user input on a user interface of the apparatus or sensing signals from sensors of the apparatus 100. The user input can be CAD data indicative of the object to be formed. The controller 128 can use that CAD data to determine properties of the structures formed during additive manufacturing processes. Based on the CAD data, the controller 128 can generate instructions usable by each of the systems operable with the controller 128, for example, to dispense the powder, to fuse the powder, to move various systems of the apparatus 100, and to sense properties of the systems, powder, and/or the workpiece 130.

In an example process of dispensing and compacting the powder, referring to FIG. 3A, powder particles are first loaded through the powder hopper 131. Referring to FIG. 3B, the powder particles travel through the powder hopper 131 toward the entrance 142 of the channel 136. The powder hopper 131 can be a reservoir for the powder. During the dispensing operations, the powder hopper 131 thereby serves as a powder source for the powder conveyor 140 and the channel 136.

The controller of the apparatus can control the conveyor drive mechanism 139 to drive the powder conveyor 140. As the powder conveyor 140 is driving, the powder particles at the entrance 142 are conveyed toward the closed end 144. The powder conveyor 140 can continue conveying the powder until the powder particles substantially fill the channel 136.

In some implementations, the controller can determine that the powder particles have substantially filled the channel 136. For example, the controller can operate the conveyor drive mechanism 139 in a speed control mode and can determine that a power level exceeding a certain threshold is indicative of the powder particles having filled the channel 136. The controller, upon determining that the powder particles have filled the channel 136, can control an amount of compaction based on the power level at which the conveyor drive mechanism 139 is operated. In some cases, the channel 136 can include optical sensors, force sensors, or other appropriate sensors that can detect an amount of packing of the powder particles, which can in turn indicate the amount of compaction of the powder particles. The pre-compaction of powder can enable greater uniformity of powder dispensed within and between each successive layer dispensed onto the build platform by the dispensing system 116.

The rings 146, before the controller operates the ring drive mechanisms 138, can initially each be set such that their openings 148 are in misaligned positions relative to the openings 152 of the cap plate 150. In this configuration, powder cannot be dispensed from any of the rings 146. When the controller has determined that the powder particles have substantially filled the channel 136 and/or has compacted the powder particles to a desired level of compaction, the controller can operate the ring drive mechanisms 138, as shown in FIGS. 3C, 3D, and 3E, to rotate the rings 146. In particular, the controller can change rotational positions of the rings 146 relative to the cap plate 150 to control a powder dispensing rate from each of the rings 146.

Each ring 146 and its corresponding cap plate openings or opening can have a configuration of ring openings and cap plate openings, for example, one of configurations described in examples of FIGS. 6A to 6D. The rings 146 and its cap plate opening or openings may each have a configuration that differs from the configuration of the other rings and cap plate openings. The controller can rotate the rings 146 to change the alignment of the ring openings and the cap plate openings.

The controller, based on, for example, stored data on each of the configurations of the rings 146 and the cap plate openings 152, can set a powder dispensing rate from each of the rings 146. The stored data can include information pertaining to, for example, sizes, positions, and other geometry of the openings 148 of each of the rings 146 and the openings 152 of the cap plate. Based on the geometric characteristics of the openings 148, 152 and the torque provided by the powder conveyor 140, the controller can compute an expected delivery rate of the powder from the combination of a particular opening of the rings 146 aligned with a particular opening of the cap plate 150.

This control of the rotational position of the rings enables the controller to set the powder dispensing rate as well as the locations along the channel 136 where powder is to be dispensed. The controller can control the rings 146 such that powder is dispensed from all of the rings 146, thus enabling wide parallel dispensing of powder onto the build platform of the apparatus. The controller can also control the rings 146 such that powder is only dispensed from some of the rings 146. The controller can therefore localize the powder dispensing to occur only along a portion of the channel 136.

The controller can control the level of compaction, the location of powder dispensing, and the rate of powder dispensing based on the desired levels for each of those parameters included in the CAD data. In this regard, the controller can control the ring drive mechanisms 138 and the conveyor drive mechanism 139 to achieve these desired parameters. Furthermore, the controller can use the CAD data, which can specify the geometry of the object to be formed, to control where the powder is to be dispensed. While the controller can control a position of the dispensing system above the build platform to control where the powder is dispensed, the controller can also control where along the dispensing system the powder is dispensed.

Referring to FIGS. 1A and 1B, the controller can control other systems to perform operations to form the object. These systems include the printhead 102, the heat source 112, and the energy source 114 to fuse the powder dispensed by the dispensing system 116. After the dispensing system 116 has dispensed a layer of the powder, the controller can control the heat source 112 and the energy source 114 to cooperate to heat and fuse the powder within the layer. The controller can then control the dispensing system 116 to dispense another layer of the powder.

Controllers and computing devices can implement these operations and other processes and operations described herein. As described above, the controller 128 of the apparatus 100 can include one or more processing devices connected to the various components of the apparatus 100, e.g., actuators, valves, and voltage sources, to generate control signals for those components. The controller can coordinate the operation and cause the apparatus 100 to carry out the various functional operations or sequence of steps described above. The controller can control the movement and operations of the systems of the printhead 102. The controller 128, for example, controls the location of feed material, including the first and second powder particles. The controller 128 also controls the intensity of the energy source based on the number of layers in a group of layers to be fused at once. The controller 128 also controls the location where energy is added by, for example, moving the energy source or the printhead.

The controller 128 and other computing devices part of systems described herein can be implemented in digital electronic circuitry, or in computer software, firmware, or hardware. For example, the controller can include a processor to execute a computer program as stored in a computer program product, e.g., in a non-transitory machine readable storage medium. Such a computer program (also known as a program, software, software application, or code) can be written in any form of programming language, including compiled or interpreted languages, and it can be deployed in any form, including as a standalone program or as a module, component, subroutine, or other unit suitable for use in a computing environment.

The controller 128 and other computing devices part of systems described can include non-transitory computer readable medium to store a data object, e.g., a computer aided design (CAD)-compatible file that identifies the pattern in which the feed material should be deposited for each layer. For example, the data object could be a STL-formatted file, a 3D Manufacturing Format (3MF) file, or an Additive Manufacturing File Format (AMF) file. For example, the controller could receive the data object from a remote computer. A processor in the controller 128, e.g., as controlled by firmware or software, can interpret the data object received from the computer to generate the set of signals necessary to control the components of the apparatus 100 to fuse the specified pattern for each layer.

While this document contains many specific implementation details, these should not be construed as limitations on the scope of any inventions or of what may be claimed, but rather as descriptions of features specific to particular embodiments of particular inventions. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The printhead of FIG. 1A includes several systems that enable the apparatus 100 to build objects. In some cases, instead of a printhead, an AM apparatus includes independently operated systems, including independently operated energy sources, dispensers, and sensors. Each of these systems can be independently moved and may or may not be part of a modular printhead. In some examples, the printhead includes only the dispensers, and the apparatus include separate energy sources to perform the fusing operations. The printhead in these examples would therefore cooperate with the controller to perform the dispensing operations.

While the operations are described to include a single size of powder particles, in some implementations, these operations can be implemented with multiple different sizes of powder particles. While some implementations of the AM apparatus described herein include two types of particles (e.g., the first and the second powder particles), in some cases, additional types of particles can be used. As described above, the first powder particles have a larger size than the second powder particles. In some implementations, prior to dispensing the second powder particles to form a layer, the apparatus dispenses third powder particles onto the platen or underlying previously dispensed layer.

The processing conditions for additive manufacturing of metals and ceramics are significantly different than those for plastics. For example, in general, metals and ceramics require significantly higher processing temperatures. Thus 3D printing techniques for plastic may not be applicable to metal or ceramic processing and equipment may not be equivalent. However, some techniques described here could be applicable to polymer powders, e.g. nylon, ABS, polyetheretherketone (PEEK), polyetherketoneketone (PEKK) and polystyrene.

A number of implementations have been described. Nevertheless, it will be understood that various modifications may be made. For example, Various components described above as being part of the printhead, such as the dispensing system(s), spreader(s), sensing system(s), heat source and/or energy source, can be mounted on the gantry instead of in the printhead, or be mounted on the frame that supports the gantry.

The dispensing system(s) can each include two or more powder conveyors, e.g., two or more screw conveyors or auger conveyors.

The cap plate can include a drive mechanism that rotates the cap plate relative to the rings. In some cases, the cap plate can translate relative to the rings. Movement of the cap plate relative to the rings can further facilitate alignment and misalignment of the openings of the rings and the openings of the cap plate.

The cap plate can include nozzles for each of the cap plate openings that enable a more precise delivery of the powder onto the build platform.

Accordingly, other implementations are within the scope of the claims.

What is claimed is:

1. An additive manufacturing apparatus for forming an object from a plurality of successive layers, the additive manufacturing apparatus comprising:
a platen to support the object being formed;
a movable dispensing system positionable over a top surface of the platen to deliver a plurality of layers of powder on the platen, the dispensing system including
a hopper to hold powder to be dispensed,
a dispenser, the dispenser having
a channel extending along a longitudinal axis from a proximal end to a distal end, the proximal end of the channel of the dispenser configured to receive the powder from the hopper;
a powder conveyor positioned within the channel to move the powder from the proximal end along a length of the channel, and
a plurality of apertures arranged along the longitudinal axis of the channel, the dispenser configured such that flow of powder through each aperture is independently controllable;
an actuator to move the dispensing system along a scan axis that is perpendicular to the longitudinal axis;
an energy source to apply energy to the powder dispensed on the top surface of the platen to form a fused portion of the powder; and
a control system including a processor to execute a computer program stored in a non-transitory computer readable media having data and instruction to cause the apparatus to deposit and fuse the plurality of successive layers to form the object, including instructions to, for each layer of the plurality of successive layers,
cause the actuator to move the dispensing system in a scan across the platen,
as the dispensing system scans across the platen cause the dispenser to deliver a layer of powder in a pattern identified by the data onto the platen or onto a previously deposited layer of the plurality of successive layers, and
cause the energy source to fuse a portion of the layer of powder.

2. The apparatus of claim 1, wherein the powder conveyor is rotatable about the longitudinal axis to move the powder in the channel along the length of the channel.

3. The apparatus of claim 2, wherein the conveyor is configured such that rotation of the conveyor about the longitudinal axis in a first direction urges the powder through the channel away from the proximal end and rotation of the conveyor about the longitudinal axis in an opposite second direction urges the powder through the channel toward the proximal end.

4. The apparatus of claim 3, comprising a motor to drive the conveyor and wherein the control system is coupled to the motor, wherein the control system is configured to cause the conveyor to alternate between rotation in a first direction and the second direction during dispensing of the powder to form the object.

5. The apparatus of claim 4, wherein the control system is configured to cause the conveyor to, prior to the dispensing, rotate in the first direction until powder extends along substantially all of the channel.

6. The apparatus of claim 2, wherein the conveyor comprises a rotatable screw.

7. The apparatus of claim 1, wherein the dispenser comprises a plurality of independently rotatable rings disposed along the longitudinal axis, each ring comprising at least one ring opening that is movable into and out of alignment with a corresponding aperture of the plurality of apertures.

8. The apparatus of claim 7, wherein the dispenser include a cap plate through which the plurality of apertures are formed, and the cap plate is exterior to the plurality of rings.

9. The apparatus of claim 7, wherein the dispenser include a cap plate through which the plurality of apertures are formed, and the plurality of rings surround the cap plate.

10. The apparatus of claim 7, wherein each ring comprises a plurality of positions spaced angularly around the ring, each position having one or more openings and having a distinct combination of a number of openings and opening size.

11. The apparatus of claim 1, wherein the dispensing system comprises a plurality of printheads, each printhead including a hoper and a dispenser.

12. The apparatus of claim 11, wherein the plurality of printheads span a width of the platen.

13. The apparatus of claim 11, wherein the plurality of printheads are arranged along the scan axis.

14. The apparatus of claim 13, wherein the plurality of printheads are configured to dispense powders having different sintering temperatures.

15. The apparatus of claim 1, wherein the distal end of the channel is closed.

16. The apparatus of claim 1, comprising a sensor to detect a degree of compaction of the powder, and wherein the controller is configured to cause the actuator to drive the conveyor based on measurements from the sensor.

17. The apparatus of claim 1, comprising a vertical actuator coupled to the platen and wherein the control system is configured to cause the vertical actuator to lower the platen after dispensing of each layer of powder.

18. The apparatus of claim 1, wherein the energy source comprises a scanning laser.

19. An additive manufacturing apparatus for forming an object from a plurality of successive layers, the additive manufacturing apparatus comprising:
   a platen to support the object being formed;
   a movable dispensing system positionable over the top surface of the platen to deliver a plurality of layers of powder on the platen, the dispensing system including a hopper to hold powder to be dispensed,
      a dispenser, the dispenser having a channel extending along a longitudinal axis and configured to receive the powder from the hopper and a plurality of apertures arranged along the longitudinal axis of the channel, the dispenser configured such that flow of powder through each aperture is independently controllable;
   a sensor configured to detect an amount of compaction of the powder in the channel;
   an actuator to move the dispensing system along a scan axis that is perpendicular to the longitudinal axis;
   an energy source to apply energy to the powder dispensed on the top surface of the platen to form a fused portion of the powder; and
   a control system coupled to the sensor and configured to control a level of compaction in the channel based on a signal from the sensor.

20. An additive manufacturing apparatus for forming an object from a plurality of successive layers, the additive manufacturing apparatus comprising:
   a platen to support the object being formed;
   a movable dispensing system positionable over the top surface of the platen to deliver a plurality of layers of powder on the platen, the dispensing system including a hopper to hold powder to be dispensed,
      a dispenser, the dispenser having a channel extending along a longitudinal axis and configured to receive the powder from the hopper and a plurality of apertures arranged along the longitudinal axis of the channel, the dispenser configured such that a size of each aperture is independently controllable;
   an actuator to move the dispensing system along a scan axis that is perpendicular to the longitudinal axis; and
   an energy source to apply energy to the powder dispensed on the top surface of the platen to form a fused portion of the powder.

* * * * *

UNITED STATES PATENT AND TRADEMARK OFFICE
CERTIFICATE OF CORRECTION

PATENT NO.       : 10,882,302 B2
APPLICATION NO.  : 16/810758
DATED            : January 5, 2021
INVENTOR(S)      : Hou T. Ng, Raanan Zehavi and Nag B. Patibandla It is certified that error appears in the above-identified patent and that said Letters Patent is hereby corrected as shown below:

In the Claims

Column 20, Line 38, in Claim 4, delete "a" and insert -- the -- therefor.

Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*